(12) United States Patent
Hudson et al.

(10) Patent No.: US 10,037,145 B1
(45) Date of Patent: Jul. 31, 2018

(54) PERFORMANT MEMORY MANAGER FOR CLOUD APPLICATIONS

(71) Applicant: Google LLC, Mountain View, CA (US)

(72) Inventors: Richard Lewis Hudson, Florence, MA (US); Russell Stensby Cox, Brookline, MA (US); David Read Chase, Belmont, MA (US); Austin Thomas Kona Clements, Arlington, MA (US)

(73) Assignee: Google LLC, Mountain View, CA (US)

( * ) Notice: Subject to any disclaimer, the term of this patent is extended or adjusted under 35 U.S.C. 154(b) by 75 days.

(21) Appl. No.: 14/886,253

(22) Filed: Oct. 19, 2015

(51) Int. Cl.
*G06F 12/00* (2006.01)
*G06F 3/06* (2006.01)
*G06F 9/46* (2006.01)
*G06F 12/02* (2006.01)

(52) U.S. Cl.
CPC .......... *G06F 3/0608* (2013.01); *G06F 3/0652* (2013.01); *G06F 3/0683* (2013.01); *G06F 9/465* (2013.01); *G06F 12/0253* (2013.01)

(58) Field of Classification Search
CPC .... G06F 3/0608; G06F 3/0652; G06F 3/0683; G06F 9/465; G06F 12/0253
USPC .................. 711/154, 158, 167; 707/813, 820; 710/18, 20, 28, 39, 60; 712/33, 225, 245
See application file for complete search history.

(56) References Cited

U.S. PATENT DOCUMENTS

| | | | | |
|---|---|---|---|---|
| 9,135,127 | B1* | 9/2015 | Havemose | G06F 11/1451 |
| 9,720,819 | B2* | 8/2017 | Anderson | G06F 12/00 |
| 2002/0095453 | A1* | 7/2002 | Steensgaard | G06F 9/5016 |
| | | | | 718/107 |
| 2005/0114413 | A1* | 5/2005 | Subramoney, Sr. | |
| | | | | G06F 12/0269 |
| 2008/0189421 | A1* | 8/2008 | Langen | H04L 29/06 |
| | | | | 709/227 |
| 2010/0082710 | A1* | 4/2010 | Kilner | G06F 12/0269 |
| | | | | 707/813 |
| 2010/0223429 | A1* | 9/2010 | Cher | G06F 12/0253 |
| | | | | 711/122 |
| 2011/0264880 | A1* | 10/2011 | Ylonen | G06F 12/0261 |
| | | | | 711/162 |

* cited by examiner

*Primary Examiner* — Reba I Elmore
(74) *Attorney, Agent, or Firm* — Lerner, David, Littenberg, Krumholz & Mentlik, LLP

(57) ABSTRACT

A present disclosure provides a garbage collector capable of freeing memory reachable only by a terminated thread immediately upon thread exit without scanning the heap or blocking other threads. A heap, including a plurality of spans, is walked, for example when the heap reaches a predetermined size. Reachable objects are marked in a mark bitmap. A mutator sweeps the mark bitmap without clearing mark bits, and newly allocated objects are not marked. When the thread terminates, sweep pointers in each of the spans owned by the terminated thread are reset. Moreover, a write barrier that makes a first unpublished object reachable from a second published object, also publishes the first object and all objects reachable from the first object.

17 Claims, 7 Drawing Sheets

PERFORMANT MEMORY MANAGER FOR CLOUD APPLICATIONS

BACKGROUND

Garbage collection is a memory management technique, which attempts to reclaim memory occupied by objects that are no longer in use by a program. Garbage collection may take a significant proportion of total processing time in a program and, as a result, can have significant influence on performance.

Generational collectors segregate recently allocated objects from older objects in order to focus more garbage collection work on reclaiming recently allocated objects. This is particularly well suited for single threaded long running applications. Garbage collectors trigger garbage collector cycles based on, for example, the amount of memory allocated.

BRIEF SUMMARY

The present disclosure proposes a new way to identify and take advantage of object lifetimes in order to focus a garbage collector on areas of a heap containing a higher proportion of dead objects in a cloud application. Moreover, it greatly reduces a need for global synchronization and enables thread local reclamation of memory. The garbage collector is scalable and adaptable to a variety of devices and networks.

One aspect of the disclosure provides a method of running a garbage collection cycle without blocking executing threads. This method includes executing, with one or more processors, a plurality of threads, and determining, with the one or more processors, whether one of the plurality of threads has terminated. If one of the plurality of threads has terminated, the one or more processors review a memory associated with the terminated thread and remove objects no longer in use by any of the plurality of threads, while continuing execution of remaining threads. In some example, the method may further include walking a heap, for example, when the heap reaches a predetermined size. The heap includes a plurality of spans, where each of the plurality of spans is associated with one of the plurality of threads, each span including a plurality of objects used by its associated thread, and marking reachable objects in the heap. According to some examples, when a mutator modifies a pointer in the heap, a write barrier is invoked which identifies a referrer object that is marked as reachable, and determines whether a referent has its mark bit set. If the referent does not have its mark bit set, the one or more processors set the mark bit of the referent, and perform a transitive walk of objects reachable from the referent, also setting unset mark bits of objects encountered in the transitive walk.

Another aspect of the disclosure provides a system, comprising one or more processors configured to execute a plurality of threads, and one or more memories storing a heap, the heap including a plurality of spans. Each of the plurality of spans is associated with one of the plurality of threads, each span including a plurality of objects used by its associated thread. A given span associated with a terminated thread is reviewable by a garbage collector without blocking other unterminated threads. The one or more memories may further store a mark bitmap in association with the heap, the mark bitmap including identifications of which objects in the heap are reachable, and the one or more processors may be further configured to sweep the mark bitmap without clearing mark bits, detect unmarked objects, and allocate new objects in place of the unmarked objects, without marking the new objects. Sweeping the mark bitmap may include generating an initial sweep pointer referring to a start of a given span, and, generating a current sweep pointer initially equal to the initial sweep pointer. An object is allocated by advancing the current sweep pointer past each object that has been marked as reachable until an unmarked object is encountered, and allocating the new object in place of the unmarked object. When a thread is terminated, the current sweep pointer for each span owned by that thread is reset. Thus, memory is freed when a thread terminates without requiring a walk of the heap at that time.

Yet another aspect of the disclosure provides a method, comprising modifying, by a mutator, a heap pointer, determining, with one or more processors, whether a referrer has its mark bit set, and if the referrer has its mark bit set, determining, with the one or more processors, whether a referent has its mark bit set. If the mark bit for the referent is unset, the one or more processors set the mark bit of the referent, walk objects reachable from the referent, and set mark bits for unmarked objects in the walk.

DETAILED DESCRIPTION

Overview

Figure 1:
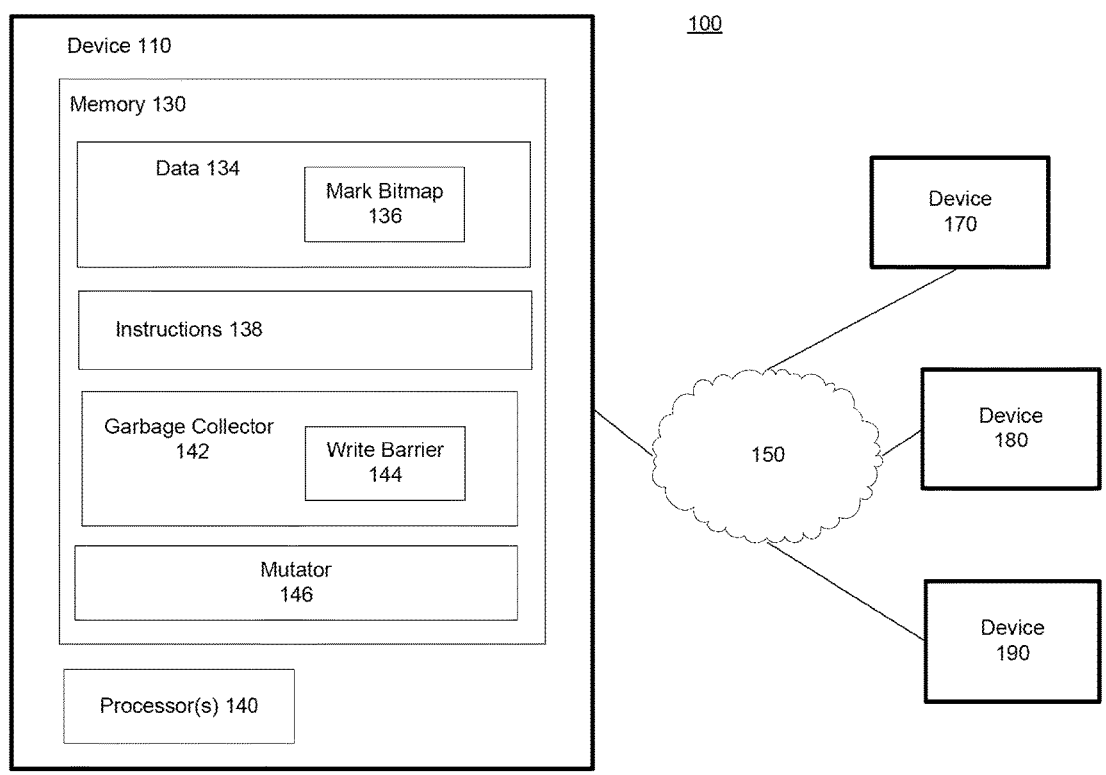
FIG. 1 is a block diagram of an example system according to aspects of the disclosure.

Some applications for the cloud, such as Go applications, are typically architected to have clusters consisting of one or more lightweight threads or coroutines, such as Goroutines. Each cluster services a single request either from a network device or from other local threads. These clusters receive messages, unmarshal them, perform a task, marshal the results, place the result on a channel or socket destined to another thread or another network device. The thread then terminates or is made dormant.

Threads access a large shared heap to, for example, read data and make modifications, such as writing log information that persists beyond the thread and the application's execution. Such log messages typically contain scalar data such as times, Internet Protocol (IP) information, and other relevant information about the request. At some point the thread may publish objects by sharing some newly allocated objects with other threads. Until an object is published it is visible only to the thread that allocated it and can be manipulated without synchronizing with other threads. Many objects allocated by a thread are local to that thread and will never be published. If the thread terminates before an object is published then the object will never be published and the memory the object uses will be unreachable and can be reused to store new objects.

In an example of the proposed garbage collector, a heap may be divided into spans containing objects and associated metadata, such as mark bits. Each garbage collector cycle walks the heap and marks reachable objects. These marks are contained in a data structure called a mark bitmap. To allocate an object, a mutator sweeps the mark bitmap, for example, from lower to higher object locations until it encounters an unmarked object. Memory associated with the unmarked bit is used for the newly allocated object. Each span maintains a current sweep pointer denoting where it is in the sweep. If visualizing the current sweep pointer as moving left to right, objects to the left have been swept and free objects used for allocation, while objects to the right have not been swept. Unmarked objects between the initial sweep pointer and the current sweep pointer denote objects that have been allocated but not published.

According to one example, the garbage collector has a write barrier, such as a code used to inform the garbage collector of actions taken by application code. For example, the write barrier may be writing a pointer into a field in the heap. The write barrier in the garbage collector monitors all pointer writes. It can determine if an object has its mark bit set. If a referrer object (e.g., an object holding a slot being written into) has its mark bit set, and a referent (e.g., a pointer being written into the slot) does not have its mark bit set, then the object is about to be published. Furthermore unpublished objects transitively reachable from the object about to be published are also about to be published. To maintain the invariant that published objects have their mark bit set, the write barrier sets the mark bit of the referent and does a transitive walk of objects reachable from the referent, setting any unmarked mark bits. Unpublished objects are only visible to the local thread. Accordingly, if the mark bits are set before the thread publishes the object, no synchronization is needed. In some circumstances, however, such as on a multiprocessor, there may be a "store fence" operation separating the marking steps and the actual write of the referrer. A branch of the transitive walk is terminated when it encounters a marked object. The local thread only has to scan local objects, and local objects aren't being mutated during the scans.

There is a finite bounded number of local objects. Each mark reduces the number of unmarked local objects. Any infinite structure must either be undergoing mutation or contain a cycle of unmarked objects. Since objects are marked before they are scanned, any such cycle of unmarked reachable local objects is broken. Thus, all published objects are marked, and unpublished objects can be conservatively identified without synchronization.

When a thread is started, it has allocated no objects and thus has published no objects. The thread may start out with no spans and continually acquire more spans as it allocates memory and uses up free space in the spans it owns. When a thread acquires a span, its current sweep pointer will be the same as the span's initial sweep pointer. All objects are allocated unpublished with unset mark bits and lay between the initial sweep pointer and the current sweep pointer. The write barrier maintains the invariant that published objects between the initial sweep pointer and the current sweep pointer will have their mark bit set. Once terminated, a thread cannot publish an object. When the thread terminates, the current sweep pointer in each span owned by the thread can be reset to initial sweep pointer, and the write barrier ensures that the mark bits are already set up such that merely resetting the sweep pointer in each owned span is enough to free unpublished objects in these spans.

Example Systems

FIG. 1 illustrates an example system 100, in which a plurality of computing devices 110, 170, 180, 190 are communicatively coupled through network 150. The plurality of network devices may include servers or other computing devices. Computing device 110 may include a garbage collector 142 configured to identify objects in memory that can be removed such that new objects can be allocated. The garbage collector 142 in the device 110 may be configured to search memory associated with threads executing on the device 110 or any of the other devices 170-190. The memory searched by the garbage collector 142 may be included in or external to the devices 110, 170-190.

The network 150 may be a datacenter, a load-balanced server farm, or any other type of computing environment, including a backplane of interconnected peripherals or a system of components on a motherboard. The network 150, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing.

The device 110 may be any type of virtualized or non-virtualized computing device or system of computing devices capable of communicating over a network. Device 110 can contain one or more processors 140, memory 130 and other components typically present in general purpose computing devices. The memory 130 can store information accessible by the one or more processors 140, including instructions 138 that can be executed by the one or more processors 140.

Memory 130 can also include data 134 that can be retrieved, manipulated or stored by the processor 140. The memory can be of any non-transitory type capable of storing information accessible by the processor, such as a hard-drive, memory card, RAM, DVD, write-capable, etc.

The instructions 138 can be any set of instructions to be executed directly, such as machine code, or indirectly, such as scripts, by the one or more processors. In that regard, the terms "instructions," "applications," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 134 can be retrieved, stored or modified by the one or more processors 140 in accordance with the instructions 138. In one example, the data 134 may include one or more mark bitmaps 136. The mark bitmap 136 may identify objects reachable by one or more threads, and may be used to identify objects to be removed in favor of newly allocated objects. Although the subject matter described herein is not limited by any particular data structure, the data can be stored in internal or external memory, computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

Garbage collector 142 may be a module of code executable by the processor 140, or in some examples it may be a separate unit with a dedicated processor. The garbage collector 142 may operate in cycles. A cycle is triggered by an event, such as the used heap reaching a certain size. The garbage collector 142 may also include write barrier 144. Write barrier 144 may be a code used to inform the garbage collector 142 of actions taken by application code. For example, the write barrier 144 may monitor all pointer writes. The write barrier 144 may also be configured to insure that published objects have their mark bit set, particularly in the case of objects transitively reachable from an object about to be published.

Mutator 146 may be part of the garbage collector 142, or may be a separate module in the device 110 or external to but communicatively coupled with the device 110. The mutator 146 sweeps the mark bitmap 136 to identify unmarked objects.

The one or more processors 140 can be any conventional processors, such as commercially available CPUs. Alternatively, the processors can be dedicated components such as an application specific integrated circuit ("ASIC") or other hardware-based processor. Although not necessary, the server 130 may include specialized hardware components to perform specific computing processes.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

The devices 170-190 may be configured similarly to the computing device 110. Although only a few computing devices are depicted in FIG. 1, it should be appreciated that the system 100 can include a large number of connected computing devices, with each different computing device being at a different node of the network 150. For example, the device 110 may be connected to a plurality of other computing devices through the network 150 or through another network (not shown). Although certain advantages are obtained when information is transmitted or received as noted above, other aspects of the subject matter described herein are not limited to any particular manner of transmission of information.

Figure 2:
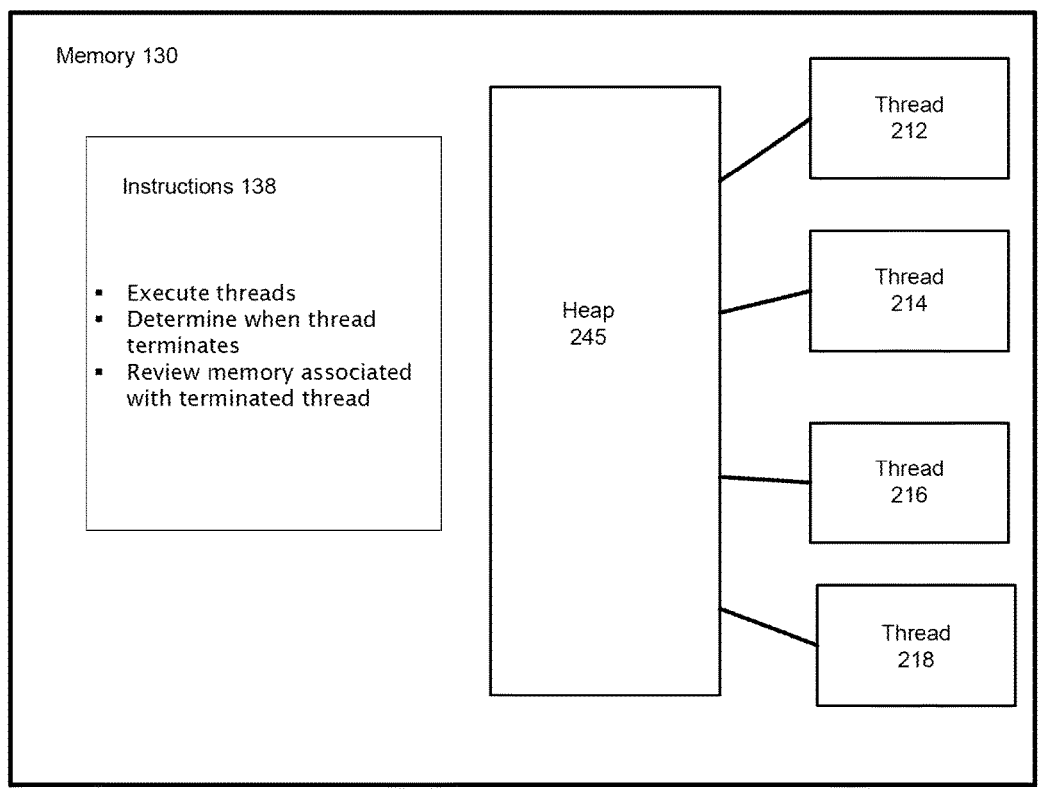
FIG. 2 is a block diagram of another example system according to aspects of the disclosure.

FIG. 2 provides another example illustration of memory 130. Heap 245 stores objects and associated metadata for threads 212, 214, 216, 218. While only a few threads are shown in FIG. 2, any number of threads may be included, and the threads may be executed on one or multiple machines. When any thread 212-218 is terminated, the garbage collector 142 (FIG. 1) may review the heap 245 for objects associated with the terminated thread. The other threads may continue executing. For example, if the thread 212 terminates, the garbage collector may review the heap 245 for objects no longer needed by the terminated thread 212. At the same time, the threads 214-218 may continue executing.

Figure 3:
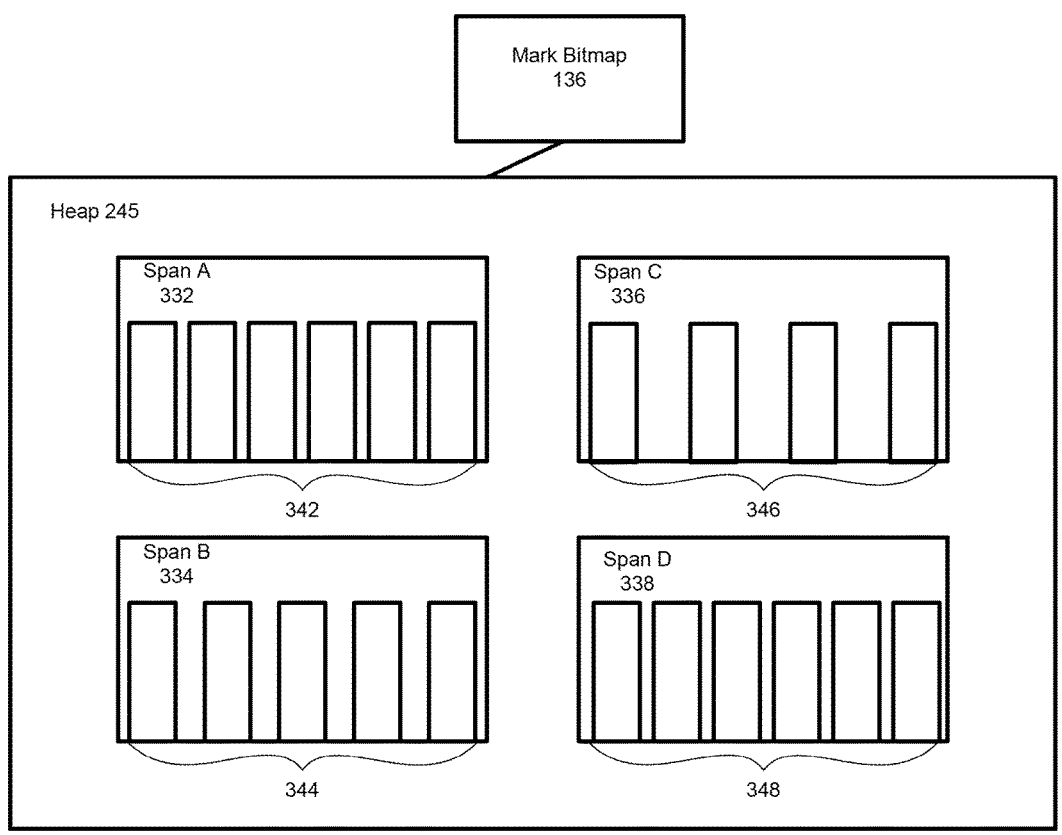
FIG. 3 is a block diagram of an example data structure according to aspects of the disclosure.

FIG. 3 illustrates a detailed example of the heap 245. Data in the heap 245 is divided into a plurality of spans 332-338. Each span 332-338 includes a plurality of objects 342-348 and associated metadata. Each span 332-338 may be associated with a particular thread. For example, the span 332 may store objects used by thread 212, the span 334 may store objects used by thread 214, etc. According to some example, multiple spans may be associated with a given thread. The spans 332-338 may each include any number of objects, whether the number is the same among the spans or different.

Each garbage collector cycle walks the heap and marks objects reachable by any thread. It is also possible to perform a garbage collection of a single thread's heap. In that case, which objects a given GC cycle marks as reachable is different. The marks are stored in the mark bitmap 136.

Figure 4:
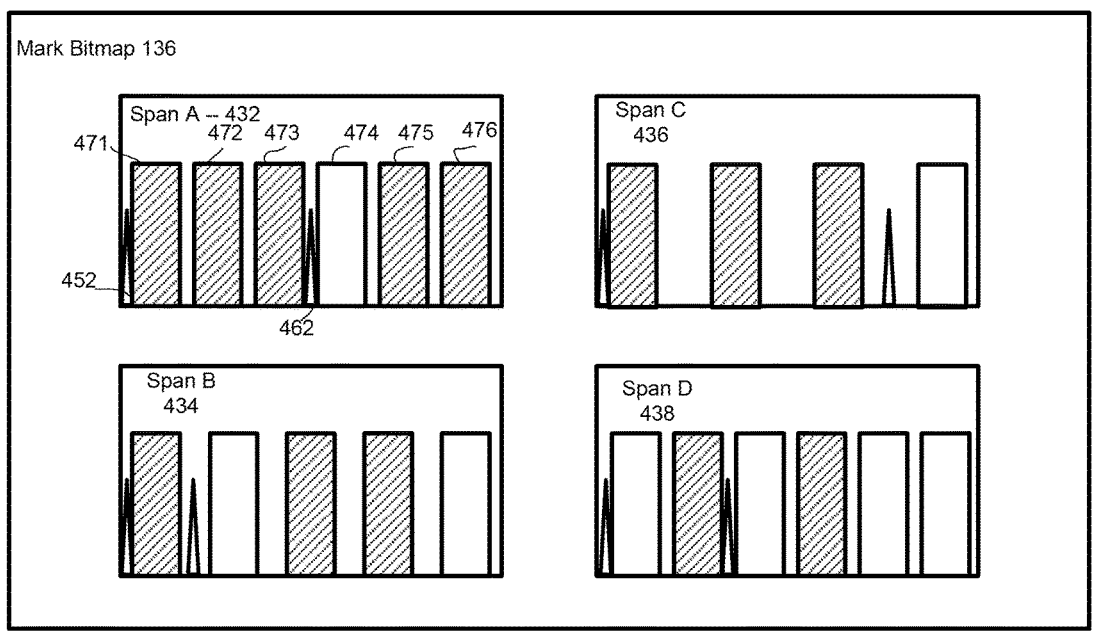
FIG. 4 is a block diagram of another example data structure according to aspects of the disclosure.

FIG. 4 illustrates a detailed example of the mark bitmap 136. Similar to the structure of the heap 245, the mark bitmap 136 may also be divided into spans 432-438, corresponding to the spans 332-338 (FIG. 3). Each span 432-438 in the bitmap 136 includes objects that have been marked by a garbage collector cycle, and potentially some unmarked objects. For example, the span 432 includes objects 471, 472, 473, 475, and 476 which have been marked as reachable and object 474 which is unmarked.

The mutator performs a sweep of the objects in each span 432-438 in the mark bitmap 136. Sweep pointers may be used to indicate a status of the sweep. For example, in the span 432, an initial pointer 452 indicates a starting point for the sweep. A current sweep pointer 462 indicates a current status. As the mutator considers each object, the current sweep pointer is advanced. The sweep continues until an unmarked object is detected. Keeping with the example of the span 432, the current pointer 462 moves past the marked objects 471-473, until it reaches the unmarked object 474. The unmarked object 474 may be removed, and a new object allocated in its slot.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5:
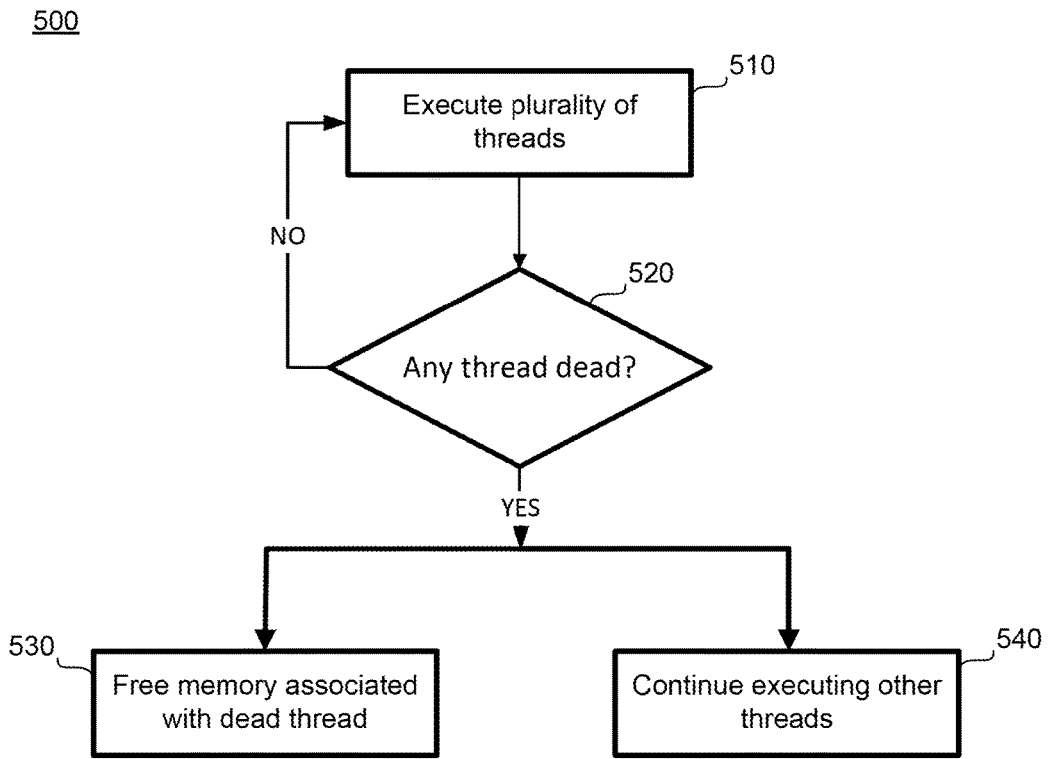
FIG. 5 is a flow diagram of an example method according to aspects of the disclosure.

FIG. 5 illustrates an example method 500 of triggering and running the garbage collector. The method may be performed by, for example, a computing device configured to review memory associated with applications running on the device itself. In other examples, the method 500 may be performed by a centralized device configured to review memory associated with applications being executed by a plurality of devices in a network. The memory may be a unit within the device itself, a distributed database, or any other structure.

In block 510, a plurality of threads are executed. In block 520, it is determined whether any of the plurality of threads are terminated.

In block 530, the garbage collector may free the memory associated with the terminated thread, removing objects which are no longer needed. At the same time, the remaining threads may continue execution in block 540.

Figure 6:
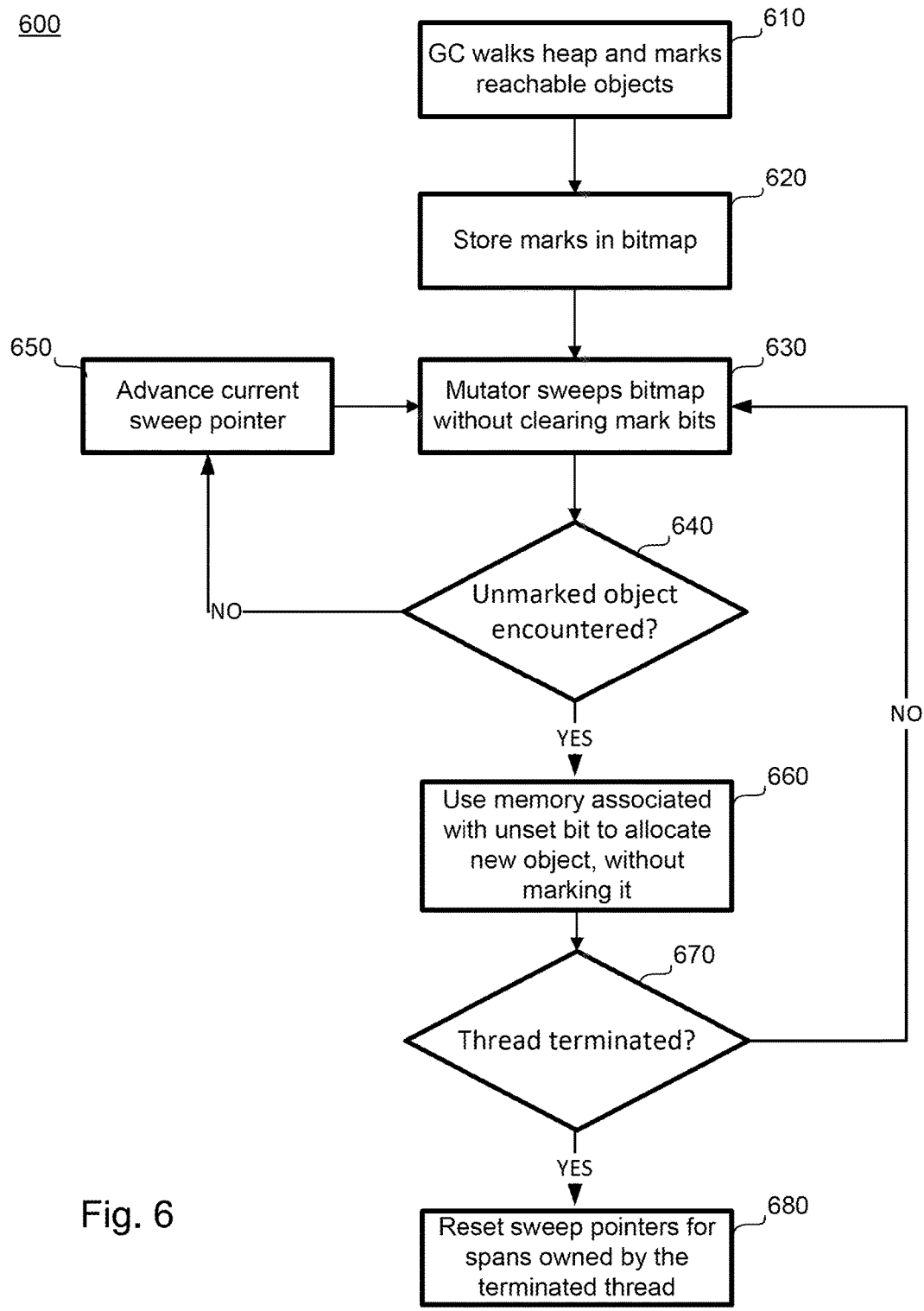
FIG. 6 is a flow diagram of another example method according to aspects of the disclosure.

FIG. 6 illustrates an example method 600, which provides more detail as to how memory associated with a terminated thread can be freed when that thread exits.

In block 610, the garbage collector walks the heap and marks reachable objects, for example when the heap reaches a predetermined size. For example, it starts from a set of roots, or objects that are always reachable, such as global variables and stacks. It marks these, then scans them to mark objects directly reachable from them, and transitively continues this process. Eventually it will run out of objects that are marked, but not scanned. At that point any object that is reachable will be marked.

The heap may be divided into a plurality of spans, each span including a plurality of objects. Each span may be owned by a thread, and threads may own multiple spans in the heap. According to one example, one or more particular spans may be selected for review by the garbage collector. According to another example, the garbage collector may walk multiple or all spans at one time.

In block 620, the marks of the marked objects are stored in a bitmap. The bitmap may maintain the same structure as the heap, with a plurality of spans. The marked objects may be marked by, for example, a pointer, flag, or any other indicator.

In block 630, the mutator performs a sweep of one or more spans in the bitmap, such as the span associated with the terminated thread. During the sweep, the mutator does not clear mark bits. For example, the mutator may generate an initial pointer at a starting point of the sweep, and sweep the span from lower to higher object locations. The mutator may also generate a current sweep pointer indicating the status of the sweep. For example, objects to one side of the current sweep pointer have been swept, and objects to the other side have not.

In block 640, it is determined whether the mutator has encountered an unmarked object during the sweep. If not, the mutator advances the current sweep pointer to the next object (block 650) and continues the sweep. However, if an unmarked object is encountered, memory associated with the unmarked object can be used for a newly allocated object (block 660), without marking the new object.

In block 670, it is determined whether a thread has terminated, such as any thread that owns one or more of the spans in the heap. If so, the sweep pointers for each span owned by the terminated thread are reset (block 680).

Modifications to pointers in the heap invoke the write barrier. According to some examples, a referrer object holding a slot being written into may have its mark bit set, and a referent object being written into the slot does not have its mark bit set. In this case, the referent object is about to be published, as well as any objects transitively reachable from the referent object. According to this example, the write barrier sets the mark bit of the referent and does a transitive walk of objects reachable from the referent, setting any unmarked mark bits. This example is illustrated in FIG. 7.

Figure 7:
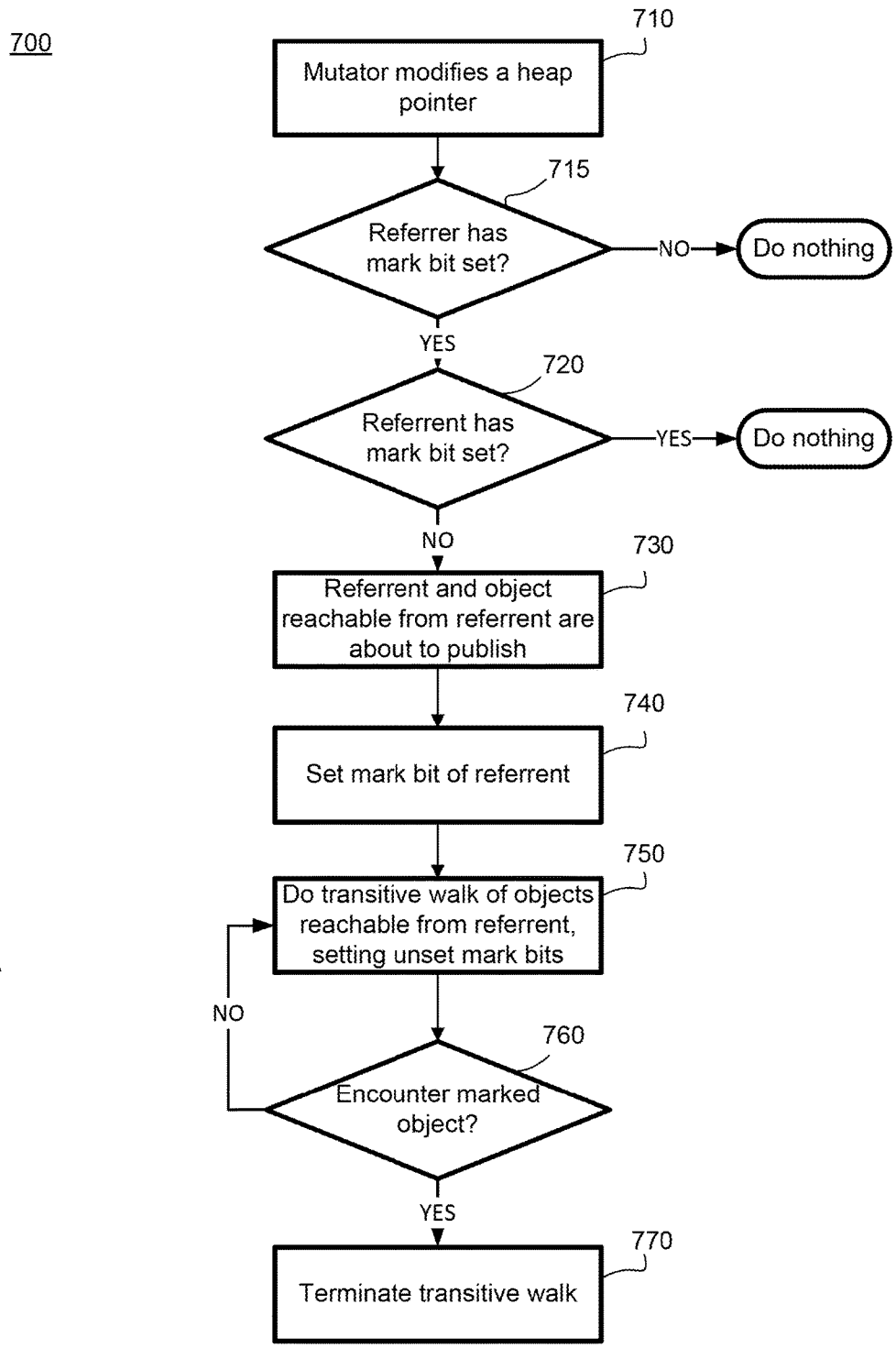
FIG. 7 is a flow diagram of another example method according to aspects of the disclosure.

FIG. 7 illustrates an example method 700 of ensuring that referent objects have their mark bits set prior to publishing, and performing a transitive walk for objects transitively reachable from a referent object. In block 710, a mutator modifies a pointer in the heap, thereby invoking the write barrier. The write barrier operations should be visible to other threads no later than the pointer modification. This may be accomplished by, for example, a store fence, or by including both operations in the same transaction or critical section.

In block 715, it is determined whether a referrer object has its mark bit set. The referrer object holds a slot in a span into which a newly allocated referent object is being written. The referrer object may be identified by, for example, the write barrier.

If the referrer object has its mark bit set, in block 720 it is determined whether the referent object has its mark bit set. If the mark bit of the referent object is set, the method 700 may return to block 710. However, if the mark bit for the referent is not set, then the referent is about to be published (block 730) and must have its mark bit set. Moreover, any objects transitively reachable from the referent are also about to be published (block 730) and must have their mark bits set as well.

In block 740, the mark bit for the referent is set, for example, by the write barrier. Further, in block 750 the write barrier does a transitive walk of objects reachable from the referent, and sets any unmarked mark bits. As multiple objects may be reachable from the referent, the transitive walk may extend out in multiple branches. If a marked object is encountered (block 760) in a particular branch, the transitive walk is terminated (block 770) for that particular branch. This may be repeated until each branch of the transitive walk is terminated.

The techniques described above are advantageous in that they are scalable to a large number of applications running in a distributed database. Further, they do not rely on moving objects in order to reclaim memory. When memory is shared between managed and unmanaged runtimes, such as between Go and C programming languages, this is particularly advantageous. Moreover, it greatly simplifies making the garbage collector concurrent.

As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
    executing, with one or more processors, a plurality of threads;
    determining, with the one or more processors, whether one of the plurality of threads has terminated;
    if one of the plurality of threads has terminated, removing, with the one or more processors, from a memory associated with the terminated thread, objects no longer in use by any of the plurality of threads, while continuing execution of other threads in the plurality of threads;
    walking a heap, the heap including a plurality of spans, where each of the plurality of threads owns one or more of the plurality of spans, each span including a plurality of objects used by its associated thread;

marking reachable objects in the heap;

generating a mark bitmap identifying the reachable objects in the heap; and sweeping the mark bitmap without clearing mark bits.

2. The method of claim 1, further comprising:

detecting unmarked objects during the sweeping; and allocating a new object in place of the unmarked object, without marking the new object.

3. The method of claim 1, wherein sweeping the mark bitmap comprises:

generating an initial sweep pointer within a given span;

generating a current sweep pointer initially equal to the initial sweep pointer;

allocating an object by advancing the current sweep pointer past each object that has been marked as reachable until an unmarked object is encountered; and allocating the new object in place of the unmarked object.

4. The method of claim 3, further comprising:

determining whether a given thread has terminated; and resetting the current sweep pointer to a position of the initial sweep pointer for each span owned by the terminated thread.

5. The method of claim 1, further comprising:

invoking a write barrier when a mutator modifies a pointer in the heap;

identifying, by the write barrier, a referrer object being marked as reachable;

determining whether a referent has its mark bit set;

if the referent does not have its mark bit set, setting the mark bit of the referent.

6. The method of claim 5, further comprising:

performing a transitive walk of objects reachable from the referent; and setting unset mark bits of objects encountered in the transitive walk.

7. The method of claim 6, further comprising continuing setting unset mark bits until a marked object is encountered in the transitive walk.

8. The method of claim 7, wherein the transitive walk is performed along multiple paths, and wherein the unset mark bits are continually set until marked objects are encountered in each path.

9. A system, comprising:

one or more processors configured to execute a plurality of threads;

one or more memories storing a heap, the heap including a plurality of spans, where each of the plurality of threads owns one or more of the plurality of spans, each span including a plurality of objects used by its associated thread, wherein a given span associated with a terminated thread is reviewable by a garbage collector without blocking other unterminated threads.

10. The system of claim 9, wherein:

the one or more memories further stores a mark bitmap in association with the heap, the mark bitmap including identifications of which objects in the heap are reachable; and the one or more processors are further configured to sweep the mark bitmap without clearing mark bits.

11. The system of claim 10, wherein the one or more processors are further configured to:

detect unmarked objects during the sweep; and allocate a new object in place of the unmarked objects, without marking the new object.

12. The system of claim 11, wherein in sweeping the mark bitmap, the one or more processors are further configured to:

generate an initial sweep pointer within a given span;

generate a current sweep pointer initially equal to the initial sweep point;

advance the current sweep pointer past each object that has been marked as reachable until an unmarked object is encountered; and allocate the new object in place of the unmarked object.

13. The system of claim 12, wherein the one or more processors are further configured to:

determine when a given thread has terminated; and reset the current sweep pointer for each span owned by the terminated thread.

14. The system of claim 10, wherein the one or more processors are further configured to:

when a mutator modifies a pointer in the heap, identify a referrer object marked as reachable;

determine whether a referent has its mark bit set;

if the referent does not have its mark bit set, set the mark bit of the referent.

15. The system of claim 14, wherein the one or more processors are further configured to:

perform a transitive walk of objects reachable from the referent; and set unset mark bits of objects encountered in the transitive walk until a marked object is encountered in the transitive walk.

16. The system of claim 15, wherein the one or more processors are configured to perform the transitive walk along multiple paths, and wherein the unset mark bits are continually set until marked objects are encountered in each path.

17. A method, comprising:

modifying, by a mutator, a heap pointer;

determining, with one or more processors, whether a referrer has its mark bit set;

if the referrer has its mark bit set, determining, with the one or more processors, whether a referent has its mark bit set;

if the mark bit for the referent is unset:

setting the mark bit of the referent;

walking objects reachable from the referent; and setting mark bits for unmarked objects in the walk.

\* \* \* \* \*